(12) United States Patent
Masciarelli et al.

(10) Patent No.: US 11,297,106 B2
(45) Date of Patent: Apr. 5, 2022

(54) PRE-ROUTING INTRUSION PROTECTION FOR CLOUD BASED VIRTUAL COMPUTING ENVIRONMENTS

(71) Applicant: SECNAP Network Security Corp., Fort Lauderdale, FL (US)

(72) Inventors: Scott Masciarelli, Fort Lauderdale, FL (US); John Meyer, Fort Lauderdale, FL (US)

(73) Assignee: SECNAP Network Security Corp., Fort Lauderdale, FL (US)

( * ) Notice: Subject to any disclaimer, the term of this patent is extended or adjusted under 35 U.S.C. 154(b) by 264 days.

(21) Appl. No.: 16/505,394

(22) Filed: Jul. 8, 2019

(65) Prior Publication Data
US 2021/0014272 A1    Jan. 14, 2021

(51) Int. Cl.
H04L 29/06 (2006.01)
(52) U.S. Cl.
CPC .......... *H04L 63/18* (2013.01); *H04L 63/1416* (2013.01)
(58) Field of Classification Search
CPC ............. H04L 63/0236; H04L 63/0263; H04L 63/1408; H04L 63/1416; H04L 63/18; H04L 63/02; H04L 63/0227
See application file for complete search history.

(56) References Cited

U.S. PATENT DOCUMENTS

| | | | |
|---|---|---|---|
| 2005/0243789 A1* | 11/2005 | Dinello | H04L 63/14 370/341 |
| 2008/0151893 A1* | 6/2008 | Nordmark | H04L 45/60 370/392 |
| 2014/0115578 A1 | 4/2014 | Cooper | |
| 2014/0317737 A1 | 10/2014 | Shin et al. | |
| 2016/0191545 A1 | 6/2016 | Nanda et al. | |
| 2017/0093921 A1* | 3/2017 | Duan | H04L 45/306 |
| 2018/0324204 A1* | 11/2018 | McClory | G06F 8/30 |
| 2019/0356697 A1* | 11/2019 | Chougule | H04L 63/20 |
| 2019/0372937 A1* | 12/2019 | Song | H04L 63/029 |
| 2020/0099703 A1* | 3/2020 | Singh | H04L 63/1416 |

* cited by examiner

*Primary Examiner* — Joseph P Hirl
*Assistant Examiner* — Ka Shan Choy
(74) *Attorney, Agent, or Firm* — CRGO Global; Steven M. Greenberg

(57) ABSTRACT

Embodiments of the present invention provide a novel and non-obvious method, system and computer program product for pre-routing network security for cloud computing. In an embodiment of the invention, a pre-routing network security method for cloud computing includes receiving in a routing component, such as a load balancer, of a cloud computing environment that includes at least two different virtualized containers, a stream of packets targeting a destination network address and, before processing the stream of packets in the routing component, diverting the stream of packets to a packet inspector executing in one of the virtualized containers. Then, only a fraction of the packets of the diverted stream of packets are received in the routing component from the packet inspector, and, the fraction of the packets are then processed in the router such that the fraction of the packets are routed to the destination network address.

7 Claims, 2 Drawing Sheets

PRE-ROUTING INTRUSION PROTECTION FOR CLOUD BASED VIRTUAL COMPUTING ENVIRONMENTS

BACKGROUND OF THE INVENTION

Field of the Invention

The present invention relates to the field of network security and more particularly to intrusion prevention in a virtualized computing environment.

Description of the Related Art

Network security consists of the policies and practices adopted to prevent and monitor unauthorized access, misuse, modification, or denial of a computer network and network-accessible resources. Different static tools combine to provide network security, most commonly including firewalls adapted to perform intrusion prevention, anti-virus and malware detection to perform intrusion detection and intrusion remediation, and file system policy driven controls aimed at limiting the ability of individuals to transmit certain types of data to certain recipients depending upon an identity or role of the transmitter. However, the nature of network security threats constantly evolves. As such, static tools are insufficient to address the dynamic evolution of network security threats.

To address the dynamic nature of network security threats, intrusion prevention and intrusion detection systems engage in real time data analysis of packets within a packet stream subject to packet inspection. Utilizing different network security rules, intrusion detection and intrusion prevention tools identify patterns within the packets known to reflect an intrusion threat so as to afford the opportunity to react to the threat without permitting the further transmission of the suspect patterns. In a standalone computing environment, such dynamic tools have been proven to be highly effective, even in the instance where the dynamic tools are deployed remotely as a service and only lightly coupled to the underlying protected computing system.

The light coupling of dynamic intrusion protection and intrusion prevention tools in the case of a proprietary standalone computing system, however, differs from that of the cloud computing environment. In a cloud computing environment, the underlying infrastructure is not accessible to the customer utilizing a virtualized container in the cloud computing environment. As such, intrusion protection and intrusion prevention techniques generally exclusively rely upon the parsing of log files generated in the virtualized container of the cloud computing environment. Consequently, real-time protection is not available in the cloud computing environment—only an out-of-bound retrospective form of protection is possible.

BRIEF SUMMARY OF THE INVENTION

Embodiments of the present invention address deficiencies of the art in respect to network security in a cloud computing environment, and provide a novel and non-obvious method, system and computer program product for pre-routing network security for cloud computing. In an embodiment of the invention, a pre-routing network security method for cloud computing includes receiving in a routing component, such as a load balancer, of a cloud computing environment that includes multiple different virtualized containers such as virtual machines, a stream of packets targeting a destination network address. Before processing the stream of packets in the routing component, the stream of packets are diverted to a packet inspector executing in one of the different virtualized containers of the cloud computing environment. Then, only a fraction of the packets of the diverted stream of packets are received back in the routing component from the packet inspector executing in the one of the different virtualized containers, and, the fraction of the packets is then processed in the routing component such that the fraction of the packets are routed to the destination network address.

In one aspect of the embodiment, the destination address is internal to another one of the virtualized containers that differs from the one of the virtualized containers hosting the packet inspector, and the stream of packets is received from a data transmitting source external to the cloud computing environment. Alternatively, in another aspect of the embodiment, the destination address is external to the cloud computing environment, and the stream of packets is received from a data transmitting source internal to another one of the virtualized containers. In yet another aspect of the embodiment, the destination address is internal to another one of the virtualized containers, and wherein the stream of packets is received from a data transmitting source internal to yet another one of the virtualized containers.

Notably, in yet another aspect of the embodiment, the packet inspector performs intrusion detection upon the stream of packets. As well, in even yet another aspect of the embodiment, the packet inspector identifies an attempt to transmit data to a restricted destination based upon the destination network address and, in response, drops the stream of packets without permitting a return of the stream of packets to the routing component so as to prevent the transmission of the data.

In another embodiment of the invention, a cloud computing data processing system is configured for pre-routing network security. The system includes at least two virtualized containers of a cloud computing environment and a routing component adapted to route packet streams into, within and out from the cloud computing environment. In this regard, the routing component may be a load balancer for the cloud computing environment. The routing component includes a configuration to process all received packet streams at a specified diversionary network address at one of the virtualized containers excepting for packet streams received from the one of the virtualized containers. In this regard, the one of the virtualized containers hosts the execution of a pre-routing network security module that is accessible at the specified diversionary network address.

The module includes computer program instructions operable during execution in the one of the virtualized containers to receive from the routing component, a stream of packets received therein and targeting a specified destination network address, but having been diverted to the one of the virtualized containers owing to the specified diversionary network address. The program instructions further are operable to perform packet inspection upon the stream of packets, apply a multiplicity of packet decision making rules specifying pass or drop outcomes, drop selected ones of the packets for having received a drop outcome during the application of the rules, and to return to the routing component, only a fraction of packets of the diverted stream of packets for routing by the routing component to the destination network address.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for pre-routing network security for cloud computing. In accordance with an embodiment of the invention, a routing component, such as a load balancer, of a cloud computing environment that includes multiple different virtualized containers, receives a packet stream configured for routing to a target destination, either within the cloud computing environment or external to the cloud computing environment. Prior to routing each packet of the packet stream to the target destination, each of the packets of the packet stream are diverted out of the routing component into one of the different virtualized containers within the cloud computing environment in which different network security rules are applied to each of the packets in order to determine whether or not to pass a corresponding one of the packets back to the routing component, or to drop the corresponding one of the packets so as to prevent the routing of the corresponding one of the packets to the target destination. As such, only a portion of the packets of the packet stream are returned to the routing component for routing to the target destination. In this way, network security including intrusion prevention and intrusion protection may be implemented in the cloud computing environment without having been limited to mere log processing for one or more of the virtualized containers of the cloud computing environment.

Figure 1:
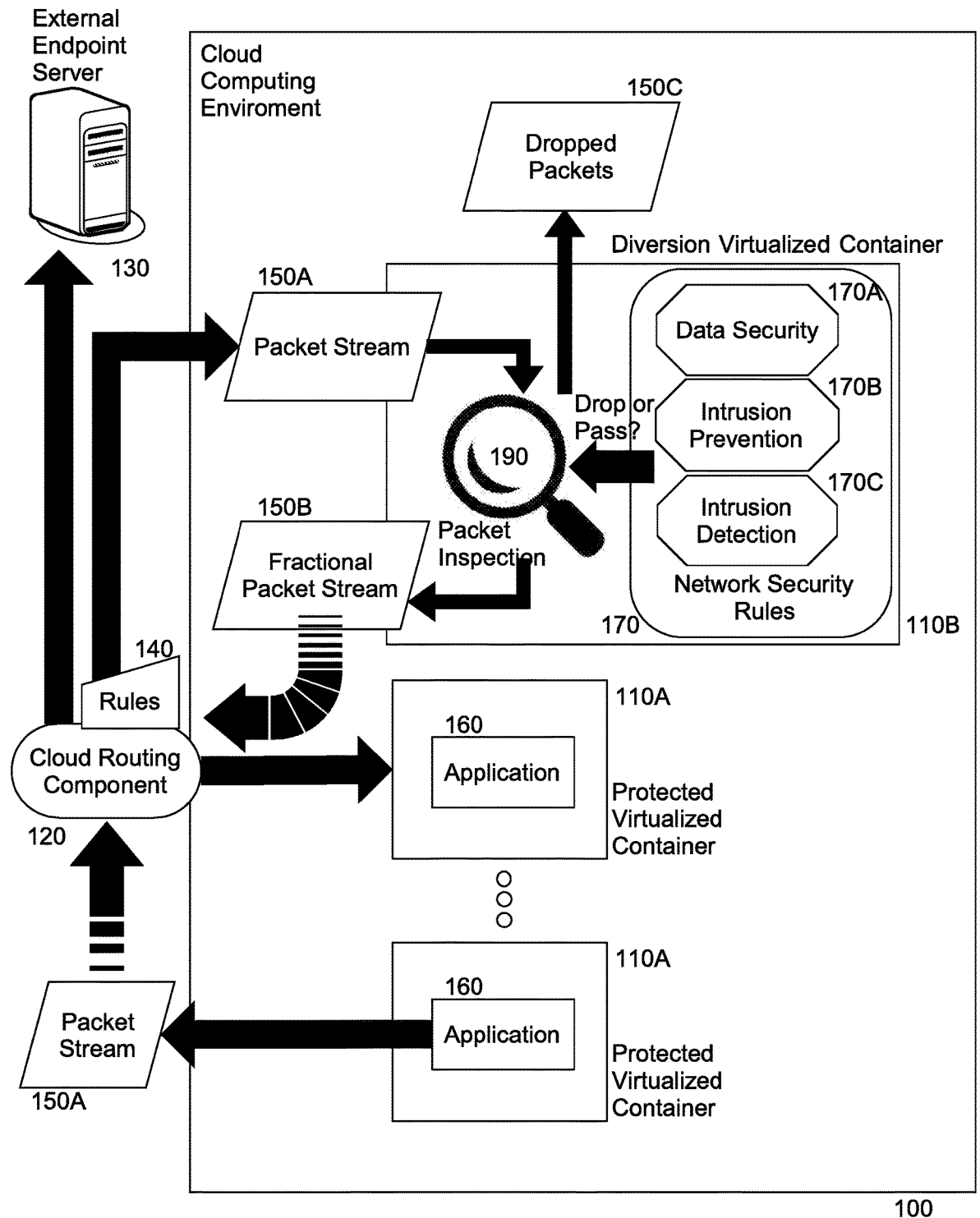
FIG. 1 is pictorial illustration of a process for pre-routing network security for cloud computing.

In further illustration, FIG. 1 is pictorial illustration of a process for pre-routing network security for cloud computing. As shown in FIG. 1, a cloud computing environment 100 includes multiple different virtualized containers 110A, 110B, such as different virtual machines, each operating within the cloud computing environment 100 and hosting the execution of one or more applications 160 therein. A packet stream 150A of packets is receive in a routing component 120 of the cloud computing environment 100, for instance a load balancer of the cloud computing environment 100. In this regard, the packet stream 150A may originate from an executing one of the applications 160 within one of the virtualized containers 110A, or from an external endpoint server 130 residing outside of and external to the cloud computing environment 100.

Upon receipt of the packet stream 150A, each of the packets of the packet stream 150A is diverted to according to a configuration rule 140 of the routing component to a particular virtualized container 110B amongst the virtualized containers 110A, 110B of the cloud computing environment 100. In this regard, the rule 140 indicates routing to a packet inspector 190 of the particular virtualized container 110B, in which different network security rules 170 are applied to each of the packets of the packet stream 150A subject to packet inspection in order to produce a drop or pass results. More specifically, the network security rules 170 include data security rules 170A, intrusion prevention rules 170B and intrusion detection rules 170C. The data security rules 170A determine whether or not data directed for transmission to a particular destination is permitted to be transmitted to the particular destination based upon an identity of the data, an identity of the particular destination, the identity of the source of the data, or any combination thereof. The intrusion prevention rules 170B in turn identify patterns evident within one or more of the packets in order to determine whether or not to permit the transmission of each of the packets to a target destination. Likewise, the intrusion detection rules 170C identify patterns evident within one or more of the packets in order to determine whether or not to permit the transmission of each of the packets to a target destination so as to detect an ongoing intrusion in one of the virtualized containers 110A, and possibly drop offending ones of the packets before an intrusion begins.

Once the network security rules 170 are applied to each of the packets of the packet stream 150A, some become dropped packets 150C and are discarded, while others are not dropped and form the basis of a fractional packet stream 150B that includes fewer packets than those of the packet stream 150A. The packet inspector 190 then returns the fractional packet stream 150B to the routing component 120. Upon return of the packets of the fractional packet stream 150B the routing component 120, the routing component then routes the packets of the fractional packet stream 150B to the target destination. In this regard, the target destination may be one of the applications 160 executing in a corresponding one of the virtualized containers 110A, or in the external endpoint server 130.

Figure 2:
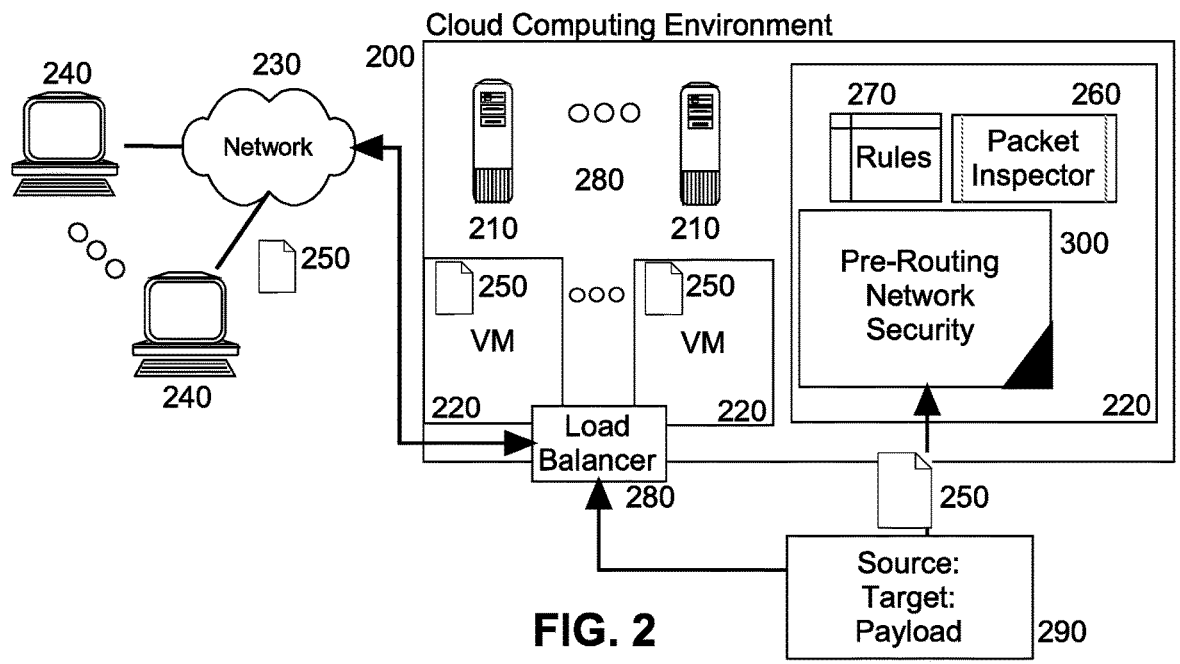
FIG. 2 is a schematic illustration of a cloud computing data processing system adapted for pre-routing network security; and, FIG. 3 is a flow chart illustrating a process for pre-routing network security for cloud computing.

The process described in connection with FIG. 1 may be implemented within a cloud computing data processing system. In yet further illustration, FIG. 2 schematically illustrates a cloud computing data processing system adapted for pre-routing network security. The system includes a cloud computing environment 200 communicatively coupled to different computing devices 240 over computer communications network 230. The cloud computing environment 200 includes one or more server computers 210 each with memory and at least one processor. Multiple different virtualized containers 220 execute in one or more of the server computers 210. The cloud computing environment 200 further includes a routing component 280 adapted to route network traffic into and out from corresponding ones of the virtualized containers 220. Optionally, the routing component 280 can be formed from two or more sub-routing components such as an outbound routing component adapted to manage outflows of traffic from the cloud computing environment 200, and an inbound routing component routing inflows of traffic into the cloud computing environment 200

Notably, one of the virtualized containers 220 includes a packet inspector 260 executing therein and adapted to apply different network security rules 270 to different packets subject to packet inspection by the packet inspector 260. As well, a pre-routing network security module 300 executes in the one of the virtualized containers 220. The pre-routing network security module 300 includes computer program instructions enabled during execution to receive a packet stream 250 from the routing component 280 originating either within the another one of the virtualized containers 220, or from one of the computing devices 240 from over the computer communications network 230. In this regard, the packet stream 250 indicates not only the originating source of the packet stream 250, but also a destination address of the packet stream 250 and also a payload 290 of data.

Thereafter, the program instructions of the pre-routing network security module 300 are enabled to subject the packet stream 250 to the packet inspector 260 for application of the network security rules 270 so as to produce a fractionalized portion of the packet stream 250. The program instructions are further enabled during execution to return the fractionalized portion of the packet stream 250 to the routing component 280. As such, the routing component 280 may then route the fractionalized portion of the packet stream to its intended destination, whether in one of the different computing devices 240, or within the another one of the virtualized containers 220.

Figure 3:
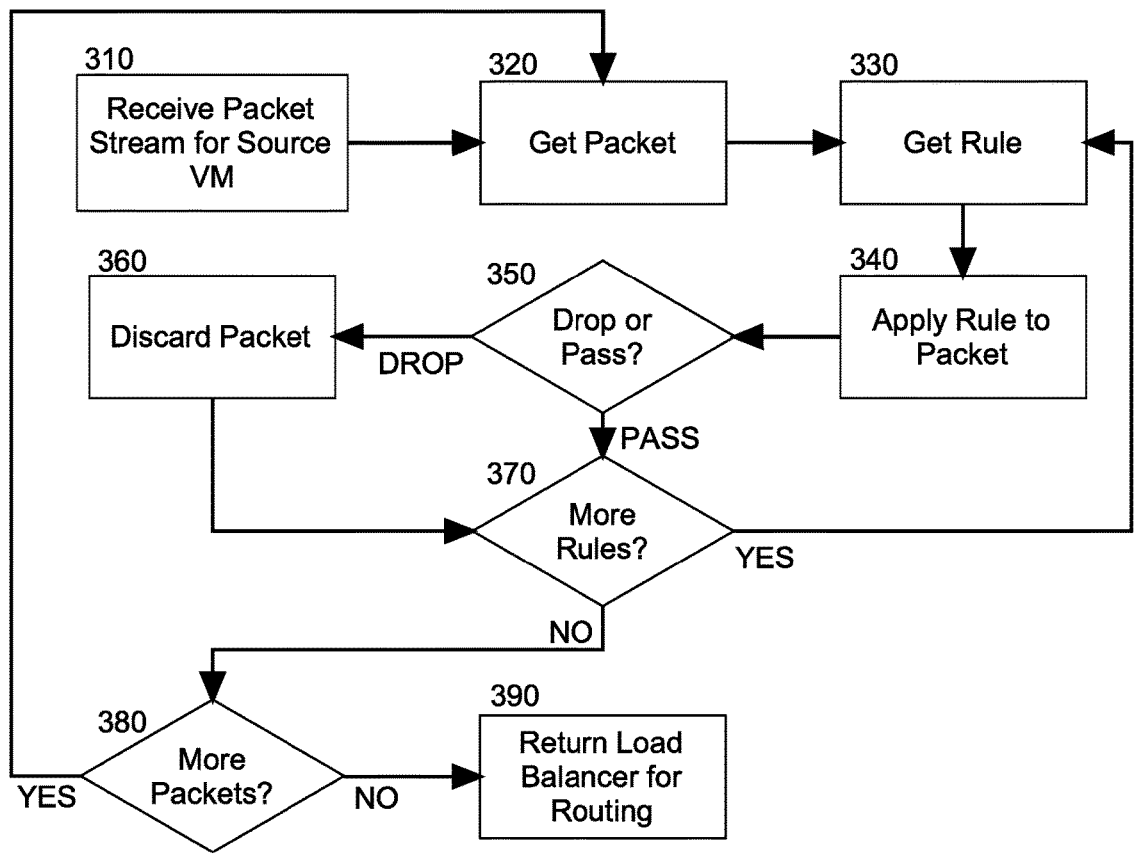

In even yet further illustration of the operation of the program instructions of the pre-routing network security module 300, FIG. 3 is a flow chart illustrating a process for pre-routing network security for cloud computing. Beginning in block 310, a packet stream is received in a packet inspector from the routing component of the cloud computing environment, and in block 320, a first packet in the packet stream is retrieved from the stream for processing. In block 330, a rule is selected for application to the retrieved packet, for instance a data security rule, an intrusion prevention rule or an intrusion detection rule. In block 340 the rule is applied to the retrieved packet.

In decision block 350, it is determined whether to drop or pass the retrieved packet based upon the application of the rule. If the decision is to drop the retrieved packet, then in block 360 the retrieved packet is discarded. In either case, in decision block 370 it is determined whether or not additional network security rules remain to be applied to the retrieved packet. If so, the process repeats in block 330 with the retrieval of a new rule for application to the retrieved packet in block 340. In decision block 370, when no further rules remain to be processed, in decision block 380 it is determined if additional packets remain to be processed. If so, a next packet is retrieved for processing in block 320 and the process repeats in block 330 with the application of a first network security rule. In decision block 380, when no further packets remain to be processed in the packet stream, those packets of the packet stream not previously discarded are returned in block 390 to the routing component.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A cloud computing data processing system configured for pre-routing network security, the system comprising:
   a multiplicity of different virtualized containers executing in memory of one or more computers of a cloud computing environment;
   a pre-routing network security module executing in one of the virtualized containers and accessible at the specified diversionary network address; and,
   a routing component for the cloud computing environment comprising a configuration to process all received packet streams at the specified diversionary network address excepting for packet streams received from a network address associated with the one of the virtualized containers in which the pre-routing network security module executes; and,
   the pre-routing network security module comprising computer program instructions operable during execution in a second virtualized container to perform:
   receive from the routing component, a stream of packets received therein and targeting a specified destination network address, but having been diverted to the one of the virtualized containers owing to the specified diversionary network address;
   performing packet inspection upon the stream of packets in the one of the virtualized containers, applying in the one of the virtualized containers a multiplicity of packet decision making rules specifying pass or drop outcomes, dropping selected ones of the packets for having received a drop outcome during the application of the rules, and
   transmitting to the routing component, only a fraction of packets of the diverted stream of packets for routing by the routing component to the destination network address.

2. The system of claim 1, wherein the routing component is a load balancer for the cloud computing environment.

3. The system of claim 1, wherein the destination address is internal to another one of the virtualized containers, and wherein the stream of packets is received from a data transmitting source external to the cloud computing environment.

4. The system of claim 3, wherein the application of at least one of the rules is determinative of an attempted intrusion upon the another one of the virtualized containers.

5. The system of claim 1, wherein the destination address is external to the cloud computing environment, and wherein the stream of packets is received from a data transmitting source internal to another one of the virtualized containers.

6. The system of claim 5, wherein the application of at least one of the rules is determinative of an attempt to transmit data to a restricted destination based upon the destination network address and, in response, is adapted to produce a drop outcome.

7. The system of claim 1, wherein the destination address is internal to another one of the virtualized containers, and wherein the stream of packets is received from a data transmitting source internal to yet another one of the virtualized containers.

* * * * *